United States Patent
Yang et al.

(10) Patent No.: US 12,457,068 B2
(45) Date of Patent: Oct. 28, 2025

(54) NR-U FOR 6GHz BAND: PAPR REDUCTION FOR CROSS CC TRANSMISSION

(71) Applicant: QUALCOMM Incorporated, San Diego, CA (US)

(72) Inventors: Luanxia Yang, Beijing (CN); Changlong Xu, Beijing (CN); Jing Sun, San Diego, CA (US); Xiaoxia Zhang, San Diego, CA (US); Hao Xu, Beijing (CN); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 17/999,494

(22) PCT Filed: Jul. 17, 2020

(86) PCT No.: PCT/CN2020/102755
§ 371 (c)(1),
(2) Date: Nov. 21, 2022

(87) PCT Pub. No.: WO2022/011698
PCT Pub. Date: Jan. 20, 2022

(65) Prior Publication Data
US 2023/0239083 A1    Jul. 27, 2023

(51) Int. Cl.
*H04L 5/00* (2006.01)
*H04L 1/00* (2006.01)
(Continued)

(52) U.S. Cl.
CPC ............ *H04L 5/001* (2013.01); *H04L 1/0067* (2013.01); *H04L 27/2605* (2013.01); *H04L 27/2628* (2013.01); *H04W 72/0453* (2013.01)

(58) Field of Classification Search
CPC .................. H04L 5/001; H04L 1/0067; H04L 27/2605; H04L 27/2628; H04L 5/0053; H04L 5/0007; H04L 5/0091; H04W 72/0453
See application file for complete search history.

(56) References Cited

U.S. PATENT DOCUMENTS

| | | | |
|---|---|---|---|
| 8,385,281 B2 * | 2/2013 | Pan ...................... | H04W 72/23 370/336 |
| 10,355,803 B2 | 7/2019 | Manolakos et al. | |

(Continued)

FOREIGN PATENT DOCUMENTS

| | | |
|---|---|---|
| CN | 102647248 A | 8/2012 |
| CN | 105119696 A | 12/2015 |

(Continued)

OTHER PUBLICATIONS

International Search Report and Written Opinion—PCT/CN2020/102755—ISA/EPO—Mar. 30, 2021.

(Continued)

*Primary Examiner* — Chandrahas B Patel
(74) *Attorney, Agent, or Firm* — Harrity & Harrity

(57) ABSTRACT

Wireless communications systems and methods related to cross Component Carrier (CC) transmission are provided that assist in minimizing PAPR. A first wireless communications device repeats data across multiple CCs in order to increase coverage while maintaining power levels within approved limits. In order to reduce PAPR, a number of different methods and mechanisms may be used. Rate matching may be performed across the multiple CCs as though a single virtual BWP. Alternatively, each copy of the data on its separate CC may be modified differently in some way, such as by using different scrambling IDs or different redundancy versions. Additionally, when utilizing DFT-s-OFDM modulation, an alternative method is provided which may lower PAPR. The DFT method includes performing a (Continued)

DFT on the combined data, tone mapping to each of the carriers, and performing an IFFT for each carrier individually. Each IFFT may be different than the other.

35 Claims, 9 Drawing Sheets

(51) Int. Cl.
*H04L 27/26* (2006.01)
*H04W 72/0453* (2023.01)

(56) References Cited

U.S. PATENT DOCUMENTS

| | | | |
|---|---|---|---|
| 2010/0232373 A1* | 9/2010 | Nory | H04W 72/23 370/329 |
| 2011/0255631 A1 | 10/2011 | Pi | |
| 2016/0218905 A1 | 7/2016 | Roh et al. | |

FOREIGN PATENT DOCUMENTS

| | | |
|---|---|---|
| CN | 106603209 A | 4/2017 |
| CN | 110115008 A | 8/2019 |
| CN | 110651522 A | 1/2020 |
| EP | 3595207 A1 | 1/2020 |
| WO | 2005029801 A1 | 3/2005 |
| WO | 2006039635 A2 | 4/2006 |
| WO | 2012025407 A1 | 3/2012 |
| WO | 2018081172 A1 | 5/2018 |

OTHER PUBLICATIONS

ITU: "Report ITU-R S.2173 Multi-carrier based transmission techniques for satellite systems S Series Fixed-satellite service", Jul. 31, 2010, XP055412757, 92 Pages, figure 1, p. 2.
Supplementary European Search Report—EP20945532—Search Authority—The Hague—Apr. 10, 2024.
Tsai Y.C., et al.,"Turbo Coded OFDM for Reducing PAPR and Error Rates", IEEE Transactions on Wireless Communications, IEEE Service Center, Piscataway, NJ, US, vol. 7, No. 1, Jan. 1, 2008, pp. 84-89, XP011381099, p. 28, figures 11,5,6.

* cited by examiner

NR-U FOR 6GHz BAND: PAPR REDUCTION FOR CROSS CC TRANSMISSION

CROSS-REFERENCE TO RELATED APPLICATIONS

The present application is a 35 U.S.C. 371 National Phase entry of Patent Cooperation Treaty (PCT) Application No. PCT/CN2020/102755, filed Jul. 17, 2020, which is hereby expressly incorporated herein by reference in its entirety.

TECHNICAL FIELD

This application relates to wireless communication systems, and more particularly to improved component carrier transmission that reduces the peak-to-average power ratio for data replicated across the component carriers.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

For example, the 6 GHz unlicensed band is approved for use with NR technology, albeit with lower maximum power and a lower maximum power spectral density (PSD) than other bands. This lower power limit reduces the link budget, however, which particularly becomes an issue for lower power modes. Problems arise, however, when replicating the same data to multiple component carriers, as it may result in an unacceptable peak to average power ratio. Thus, there is a need to provide a way to improve the coverage of certain types of information transmitted between a BS and a UE that has improved peak to average power ratio characteristics.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes determining, by a first wireless communications device, a plurality of component carriers on which to transmit a data message. The method further includes rate matching, by the first wireless communications device, the data message across the plurality of component carriers as a virtual bandwidth part. The method further includes transmitting, by the first wireless communications device, the data message via the plurality of component carriers to a second wireless communications device.

In an additional aspect of the disclosure, a method of wireless communication includes determining, by a first wireless communications device, a first component carrier on which to transmit a first copy of a data message and a second component carrier on which to transmit a second copy of the data message, the first and second component carriers being different from each other. The method further includes coding, by the first wireless communications device, the first copy of the data message for the first component carrier using a first value of a coding characteristic and the second copy of the data message for the second component carrier using a second value of the coding characteristic, the first and second values being different from each other. The method further includes transmitting, by the first wireless communications device after the coding, the first copy of the data message on the first component carrier concurrently with the second copy of the data message on the second component carrier to a second wireless communications device.

In an additional aspect of the disclosure, a first wireless communications device includes a processor configured to determine a plurality of component carriers on which to transmit a data message. The wireless communications device further includes a processor configured to rate match the data message across the plurality of component carriers as a virtual bandwidth part. The wireless communications device further includes a transceiver configured to transmit the data message via the plurality of component carriers to a second wireless communications device.

In an additional aspect of the disclosure, a first wireless communications device includes a processor configured to determine a first component carrier on which to transmit a first copy of a data message and a second component carrier on which to transmit a second copy of the data message, the first and second component carriers being different from each other. The first wireless communications device further includes a processor configured to code the first copy of the data message for the first component carrier using a first value of a coding characteristic and the second copy of the data message for the second component carrier using a second value of the coding characteristic, the first and second values being different from each other. The first wireless communications device further includes a transceiver configured to transmit, after the coding, the first copy of the data message on the first component carrier concurrently with the second copy of the data message on the second component carrier to a second wireless communications device.

In an additional aspect of the disclosure, a non-transitory computer-readable medium having program code recorded thereon, the program code includes code for causing a first wireless communications device to determine a plurality of component carriers on which to transmit a data message.

The non-transitory computer-readable medium further comprising code for causing the first wireless communications device to rate match the data message across the plurality of component carriers as a virtual bandwidth part. The non-transitory computer-readable medium further comprising code for causing the first wireless communications device to transmit the data message via the plurality of component carriers to a second wireless communications device.

In an additional aspect of the disclosure, a non-transitory computer-readable medium having program code recorded thereon, the program code includes code for causing a first wireless communications device to determine a first component carrier on which to transmit a first copy of a data message and a second component carrier on which to transmit a second copy of the data message, the first and second component carriers being different from each other. The non-transitory computer-readable medium further comprising code for causing the first wireless communications device to code the first copy of the data message for the first component carrier using a first value of a coding characteristic and the second copy of the data message for the second component carrier using a second value of the coding characteristic, the first and second values being different from each other. The non-transitory computer-readable medium further comprising code for causing the first wireless communications device to transmit, after the coding, the first copy of the data message on the first component carrier concurrently with the second copy of the data message on the second component carrier to a second wireless communications device.

In an additional aspect of the disclosure, a first wireless communications device comprises means for determining, by a first wireless communications device, a plurality of component carriers on which to transmit a data message. The first wireless communications device further comprises means for rate matching, by the first wireless communications device, the data message across the plurality of component carriers as a virtual bandwidth part. The first wireless communications device further comprises means for transmitting, by the first wireless communications device, the data message via the plurality of component carriers to a second wireless communications device.

In an additional aspect of the disclosure, a first wireless communications device comprises means for determining, by a first wireless communications device, a first component carrier on which to transmit a first copy of a data message and a second component carrier on which to transmit a second copy of the data message, the first and second component carriers being different from each other. The first wireless communications device further comprises means for coding, by the first wireless communications device, the first copy of the data message for the first component carrier using a first value of a coding characteristic and the second copy of the data message for the second component carrier using a second value of the coding characteristic, the first and second values being different from each other. The first wireless communications device further comprises means for transmitting, by the first wireless communications device after the coding, the first copy of the data message on the first component carrier concurrently with the second copy of the data message on the second component carrier to a second wireless communications device Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
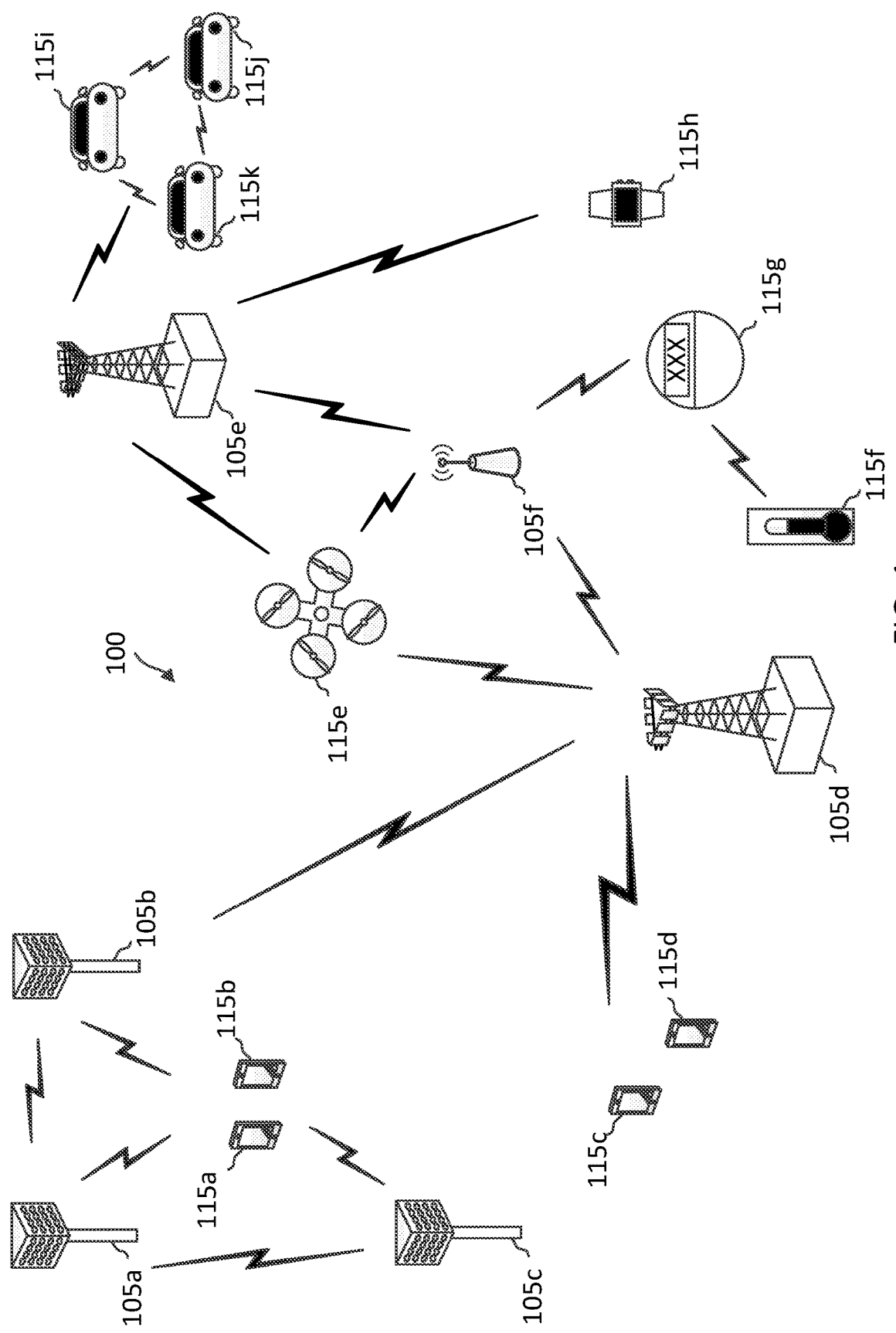
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, orthogonal frequency division multiplexing (OFDM) and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Communications can be in the form of radio frames. A radio frame may be divided into a plurality of subframe, which can be divided into one or more slots. Each slot may be further divided into mini-slots. At the smallest level (e.g., within a slot), a resource element (RE) comprises a single subcarrier in the frequency domain, and a single OFDM symbol in the time domain. A resource element group (REG) may be comprised of a number of REs (e.g., 12) within a single OFDM symbol. A control channel element (CCE) comprises a group of REGs.

In NR, PDCCH is transmitted over a Control Resource Set (CORESET). A CORESET is a set of CCEs which is used to carry PDCCH transmissions, for example 1, 2, 4, 8, or 16 CCEs. A CORESET is generally limited to span less than the full frequency range of a radio frame. Each CORESET has an associated CCE to REG mapping. Frequencies within a CORESET can be contiguous or non-contiguous. A CORESET may span one or more OFDM symbol time periods. A set of potential PDCCH candidates is called a search space and is associated with a CORESET and can have configurable monitoring occasions defined. A BS may configure a UE with one or more search spaces for PDCCH monitoring based on the predefined CORESET. The UE may perform blind decoding in the search spaces to search for DL control information from the BS. For example, a BS may configure a UE with the BWPs, the CORESETS, and/or the PDCCH search spaces via RRC configurations.

Signaling between BSs and UEs may be limited in terms of the level of power allowed for the signals in certain situations, such as in particular bandwidths and uses. When using a part of the spectrum that has reduced power requirements, it may be advantageous to seek other ways to increase the bandwidth of signals to ensure reliable delivery to the receiving device. This may be particularly useful in lower-power modes, such as low-power indoor (LPI) mode. As used herein, the LPI mode may refer to a mode that has a maximum allowed equivalent isotropically radiated power (EIRP) and power spectral density (PSD) that is low enough that a BS may use it in communicating with a UE without contacting an automated frequency coordination (AFC) function. This is in contrast with a standard power (SP) mode, that may utilize an AFC function to coordinate what the maximum PSD and EIRP are for each frequency. The LPI mode may have lower EIRP and PSD maximum, with the UE transmit power being less than the BS transmit power. Another mode, very low-power (VLP) mode, has yet further PSD and EIRP limitations than those imposed on devices operating in LPI mode.

The present application describes mechanisms for achieving larger bandwidth utilization for signals so as to reliably transmit information while remaining below allowable power levels, while also minimizing the peak to average power ratio (PAPR). To achieve this, embodiments of the present disclosure include transmitting the information (e.g., control data and user data) across multiple component carriers (CCs). For example, the information may be extended across all selected component carriers, or replicated across some or all component carriers. Embodiments of the present disclosure further minimize the PAPR.

For example, in some aspects the information (also referred to herein as a message, data message, etc., which may correspond to control as well as user data to be transmitted from one device to another, whether DL or UL) may be rate matched across all of the selected component carriers. In other words, instead of rate matching within each component carrier separately, the multiple component carriers are treated as one virtual bandwidth part (BWP). Accordingly, the information is not repeated in each component carrier, but rather spread out once across the component carriers via the continuous rate matching. With this approach, the PAPR may remain within an acceptable level.

In some other aspects, the information may be repeated in each component carrier. In an embodiment, to address the PAPR increase due to the additive nature of the same signal overlapping in each component carrier, embodiments of the present disclosure may scramble the data in each component carrier with a different scrambling identifier (ID) so that the physical signals assume different characteristics from each other. This may be achieved by scrambling based on a value associated with each component carrier. The scrambling ID may be assigned semi-statically via RRC for example. In another example, the value of the scrambling ID may be based on some other parameter or parameters such as a combination of cell ID and component carrier index (e.g., either an absolute index of all component carriers or an index based on just scheduled component carriers). Alternatively, instead of using different scrambling IDs for each component carrier, the physical signals of the different component carriers may be altered by implementing a different Redundancy Version (RV) for each component carrier carrying the repeated data. The RVs may be applied to each component carrier according to some pattern such as a sequence of RVs to cycle through.

The above approaches may be applied to various types of modulation, such as cyclic prefix orthogonal frequency division multiplexing (CP-OFDM) or discrete fourier transform spread OFDM (DFT-s-OFDM). For DFT-s-OFDM waveforms, additional reduction in PAPR may be achieved by modifying the way in which signals are modulated. For example, DFT-s-OFDM signals may be generated in a way such that a DFT is performed on the input data, the output of the DFT is tone-mapped to each of the component carriers for which the data is to be transmitted/repeated, and independent inverse fast fourier transforms (IFFTs) can then be performed on each tone-mapped output (e.g., with the number of channels for the IFFTs corresponding to the number of component carriers being used for the transmission). The outputs of each IFFT may be, in their respective channels, up-sampled and up-converted, then the outputs of each of those processes summed together for transmission.

Aspects of the present disclosure can provide several benefits. For example, in conditions where power levels are required to be low, such as under LPI, increasing the bandwidth of signals by repeating over multiple component carriers allows the signals to be strengthened by effectively increasing their bandwidth. As such, reliability may be achieved while maintaining allowable power levels. The various methods described herein to vary the physical signals for the data provide the additional benefit of minimizing the PAPR of the combined transmission. This allows the amplifier(s) of the transmitting device to perform better as the signals are within a tighter dynamic range, thus also reducing cost for the size of amplifier(s) required.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable. As a specific example of OFDM-based waveforms, the network 100 may utilize CP-OFDM waveforms for DL and/or UL transmissions. As another example, the network 100 may utilize DFT-s-OFDM waveforms for some UL transmissions. At least with respect to UL transmissions, a BS 105 may indicate to a UE 115 whether to use CP-OFDM or DFT-s-OFDM modulating for a given UL transmission or type of transmission.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. As noted above, the communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. Control information, such as PDCCH etc., has been discussed above and will be described further below with respect to embodiments of the present disclosure. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple bandwidth parts (BWPs) (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications. The BS 105 may additionally configure the UE 115 with one or more CORESETs in a BWP. A CORESET may include a set of frequency resources spanning a number of symbols in time. The BS 105 may configure the UE 115 with one or more search spaces for PDCCH monitoring based on the CORESETS. The UE 115 may perform blind decoding in the search spaces to search for DL control information from the BS. In an example, the BS 105 may configure the UE 115 with the BWPs, the CORESETS, and/or the PDCCH search spaces via RRC configurations. Mechanisms for configuring search spaces are described in greater detail herein.

In some aspects, the network 100 may operate over a shared channel, which may include shared frequency bands or unlicensed frequency bands. For example, the network 100 may be an NR-U network. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a BS 105 may acquire or reserve a TXOP or a channel occupancy time (COT) in the shared channel by performing a CAT4 LBT. A CAT4 LBT refers to an LBT with a random backoff and a variable contention window. Upon passing the LBT, the BS 105 may schedule one or more UEs 115 for DL communications and/or UL communications within the acquired COT.

For example, the 6 GHz band is being made available for unlicensed use (e.g., in addition to other unlicensed bands such as 5 GHz). So as to not disrupt incumbent licensed use in the band, power levels are limited depending on the context. Allowed power levels are determined by the mode of operation and the context. Currently, in the 5.925-6.425 GHz and 6.525-6.875 GHz sub-band unlicensed access points are permitted to transmit both indoors and outdoors under the control of an automated frequency control (AFC) function at higher EIRP and PSD. This is called "Standard-Power" (SP) access. A standard power access point (e.g. a BS) may be allowed 36 dBm maximum equivalent isotropic radiated power (EIRP) and 23 dBm/MHz maximum EIRP power spectral density (PSD). Meanwhile, in Low-Power indoor (LPI) access mode, a Low-Power access point may be allowed 30 dBm maximum EIRP and 5 dBm/MHz maximum EIRP PSD across the entire 1,200 MHz of the 6 GHz band, without being under the control of an AFC function. In general, clients (e.g. UEs) are allowed 6 dB less power than access points in each respective mode (SP and LPI). These power limitations are lower than the 5 GHz band, for example, and may come at the expense of reduced link budget, which particularly becomes an issue for lower power modes.

According to embodiments of the present disclosure, a BS 105 or UE 115 may transmit a message over multiple component carriers in order to achieve a sufficient effective power level while remaining under the allowable power limits. To address and mitigate or minimize PAPR issues that may arise from repeating the same data (e.g., control data and user data, or either alone) on each component carrier at the same transmission time, embodiments of the present disclosure include a first wireless communications device transmitting the information (e.g., control data and user data) across multiple component carriers to a second wireless communications device either by rate matching a single copy of the data across the component carriers, or by altering other physical characteristic(s) of the modulated waveforms of each component carrier. The first wireless communications device may be a BS 105 and the second wireless communications device may be a UE 115, such that the transmission is on the DL. Alternatively, the first wireless communications device may be a UE 115 and the second wireless communications device a BS 105, such that the transmission in on the UL.

In embodiments where rate matching is used, the data may be rate matched across all of the selected component carriers, instead of rate matching within each component carrier separately. As a result, the multiple component carriers are treated as one virtual bandwidth part (BWP) across which rate matching is performed. In other embodiments, the data may be repeated in each component carrier. To address the PAPR such situations, the data in each component carrier may be scrambled with a different scrambling identifier (ID) so that the physical signals assume different characteristics from each other. This may be achieved by scrambling based on a value associated with each component carrier. The scrambling ID may be based on some parameter or parameters such as a combination of cell ID and component carrier index (e.g., either an absolute index of all component carriers or an index based on just scheduled component carriers). Alternatively, instead of using different scrambling IDs for each component carrier, the physical signals of the different component carriers may be altered by implementing a different Redundancy Version (RV) for each component carrier carrying the repeated data. The RVs may be applied to each component carrier according to some pattern such as a sequence of RVs to cycle through.

Additional reduction in PAPR may be achieved by modifying the way in which signals are modulated. For example, DFT-s-OFDM signals may be generated for a UE 115 to transmit the data on the UL to a BS 105 such that a DFT is performed on the input data, the output of the DFT is tone-mapped to each of the component carriers for which the data is to be transmitted/repeated, and independent inverse fast fourier transforms (IFFT)s can then be performed on each tone-mapped output (e.g., with the number of channels for the IFFTs corresponding to the number of component carriers being used for the transmission). The outputs of each IFFT may be, in their respective channels, up-sampled and up-converted, then the outputs of each of those processes summed together for transmission.

Figure 2:
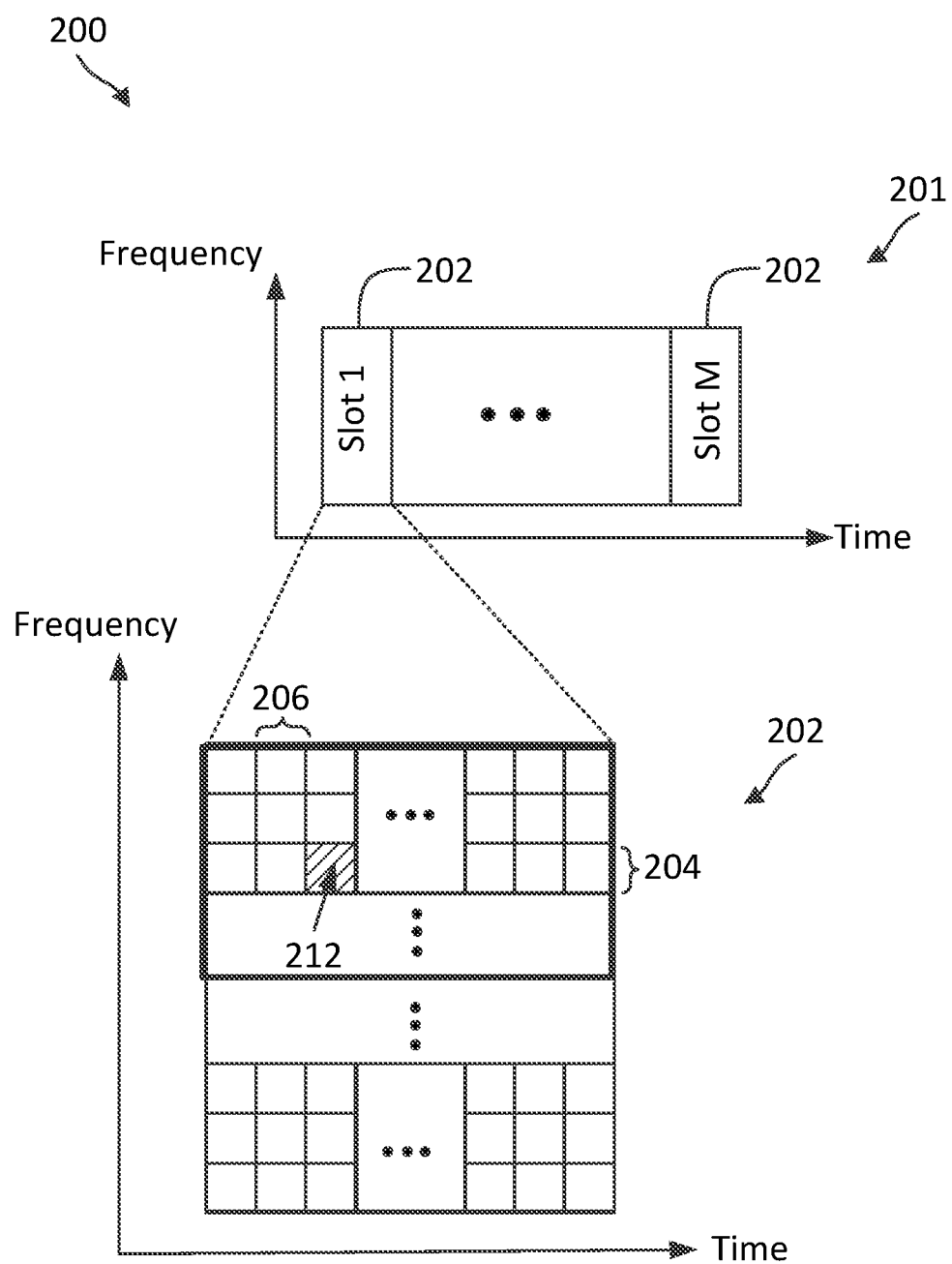
FIG. 2 illustrates a transmission frame for a communication network according to some embodiments of the present disclosure.

FIG. 2 is a timing diagram illustrating a transmission frame structure 200 according to some embodiments of the present disclosure. The transmission frame structure 200 may be employed by BSs such as the BSs 105 and UEs such as the UEs 115 in a network such as the network 100 for communications. In particular, the BS may communicate with the UE using time-frequency resources configured as shown in the transmission frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the embodiments. In an example, the radio frame 201 may have a duration of about ten milliseconds. The radio frame 201 includes M number of slots 20, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the embodiments, for example, based on the channel bandwidth, the subcarrier spacing (SCS), and/or the cyclic prefix (CP) mode. One subcarrier 204 in frequency and one symbol 206 in time forms one resource element (RE) 212 for transmission.

According to embodiments of the present disclosure, data may be rate matched or repeated across multiple frequency carriers in order to increase coverage for the modulated signal while remaining within a specified PSD and EIRP (e.g., according to a low power mode such as LPI mode). Further, characteristics of the signal may be modified by changing how the repeated data is modulated at each component carrier. For example, the repeated data at each component carrier may be scrambled with a different scrambling ID such as based on a cell ID and a component carrier index (e.g., absolute or based on scheduled component carriers). As another example, the data may be modulated using a different RV per component carrier, determined for example by a sequential pattern. Where the modulation used is DFT-s-OFDM, further embodiments of the present disclosure may apply a different approach towards generating the DFT-s-OFDM waveform. These various examples will be discussed in further detail below.

Figure 3:
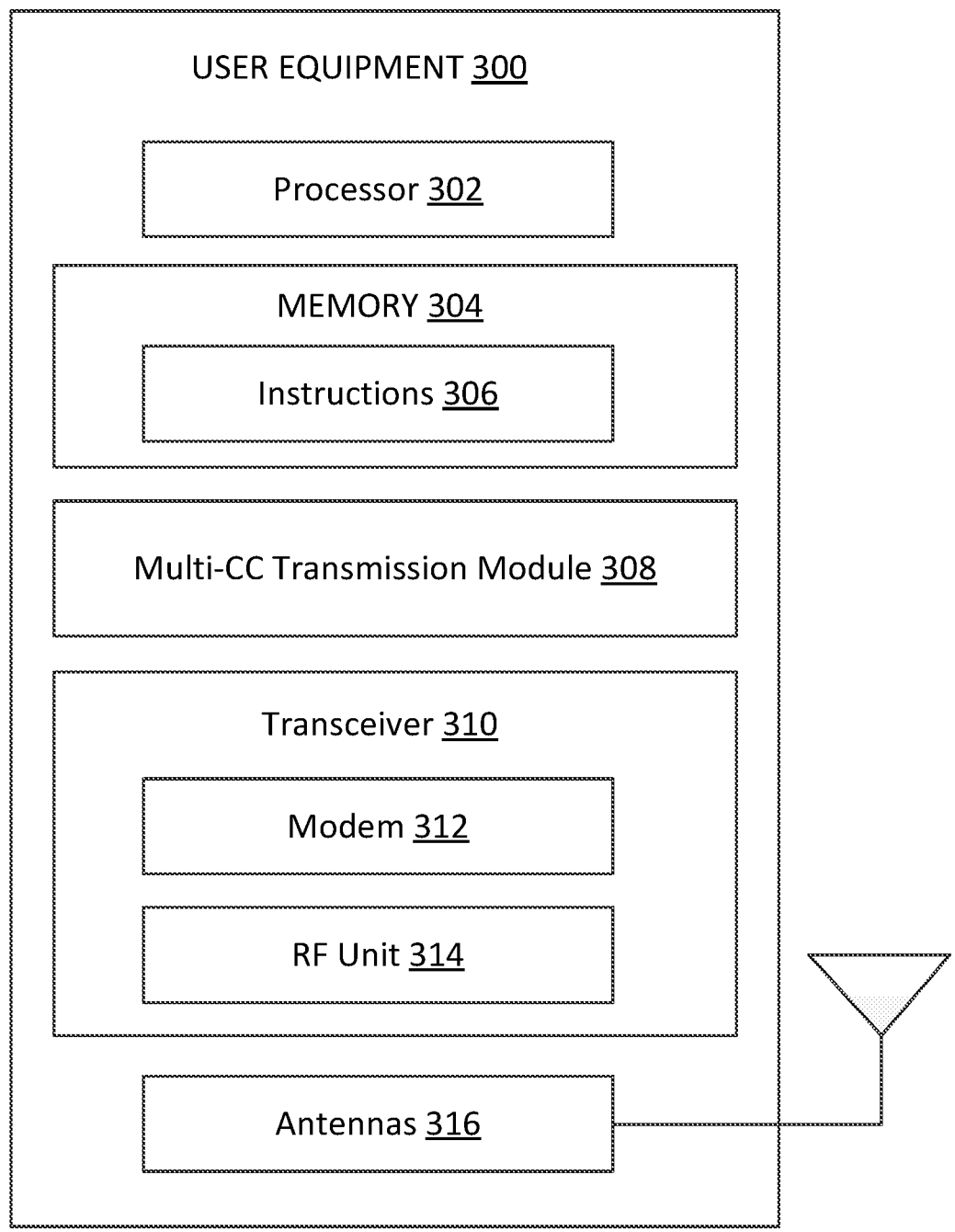
FIG. 3 illustrates a block diagram of an exemplary user equipment (UE) according to some embodiments of the present disclosure.

FIG. 3 is a block diagram of an exemplary UE 300 according to embodiments of the present disclosure. The UE 300 may be a UE 115 in the network 100 as discussed above in FIG. 1. As shown, the UE 300 may include a processor 302, a memory 304, a Multi-CC transmission module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 404 may store, or have recorded thereon, instructions 306. The instructions 306 may include instructions that, when executed by the processor 302, cause the processor 302 to perform the operations described herein with reference to the UEs 115 in connection with embodiments of the present disclosure, for example, aspects of FIG. 5-9. Instructions 306 may also be referred to as program code. The program code may be for causing a wireless communication device to perform these operations, for example by causing one or more processors (such as processor 302) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The Multi-CC transmission module 308 may be implemented via hardware, software, or combinations thereof. For example, the Multi-CC transmission module 308 may be implemented as a processor, circuit, and/or instructions 306 stored in the memory 304 and executed by the processor 302. In some examples, the Multi-CC transmission module 308 can be integrated within the modem subsystem 312. For example, the Multi-CC transmission module 308 can be implemented by a combination of software components (e.g., executed by a DSP or a general processor) and hardware components (e.g., logic gates and circuitry) within the modem subsystem 312.

The Multi-CC transmission module 308 may be used for various aspects of the present disclosure, for example, aspects of FIGS. 5-9. The Multi-CC transmission module 308 may be configured to arrange use of multiple component carriers by which to transmit data to another device, such as a BS 105. This may involve utilizing a number of component carriers scheduled by the BS 105 for use by the UE 300 for carrier aggregation, or alternatively the UE 300 selecting the component carriers (e.g., without BS 105 instruction or of a subset of component carriers from a list of carriers scheduled for the UE 300 from the BS 105). With respect to the data to be transmitted, both control data and user data associated with a given amount of data to transmit to the BS 105 may be implemented according to embodiments of the present disclosure. In one example, the multi-CC transmission module 308 may treat the component carriers as a virtual BWP. By treating the multiple component carriers as a single virtual BWP, the multi-CC transmission module 308 may continuously rate match the data over all of the component carriers instead of rate matching within each component carrier separately. This may aid in minimizing the PAPR while extending the bandwidth by carrier aggregation.

In another embodiment, the multi-CC transmission module 308 may create copies of the data on multiple component carriers. There may be a different copy of the data corresponding to each scheduled component carrier (i.e., a one-to-one correspondence of data copy and component carrier). To minimize PAPR from transmitting the same data via different component carriers (e.g., at the same time resulting in the signals adding together over the air), the multi-CC transmission module 308 may alter some properties used in modulating the data per component carrier. As a result, the modulated waveform per component carrier may exhibit different properties from the other component carriers tasked with conveying the same repeated data. For example, the Multi-CC transmission module 308 may use different scrambling IDs per component carrier to achieve the varied waveforms. The different scrambling IDs may be configured via an RRC signaling.

Alternatively, the multi-CC transmission module 308 may construct the different scrambling IDs (per component carrier, for example) using a combination of the cell ID and an index value per component carrier. In this approach, each component carrier may be numbered with an index value, starting for example with a zero value. Thus, if there were four component carriers available (as a simple example for ease of discussion), the component carriers may be numbered so that the first component carrier has an index value of 0, the second component carrier has an index value of 1, the third component carrier has an index value of 2, and the fourth component carrier has an index value of 3. In one example, this may be an absolute index, referring to numbering all of the component carriers, even if not all of the component carriers are scheduled for use by the UE 300 for transmitting the data. Thus, continuing with the example of four component carriers available, and only the first and fourth component carriers are scheduled for use for transmitting the data, the multi-CC transmission module 308 may use the index values of 0 and 3 (corresponding to the first and fourth scheduled component carriers, respectively) in combination with the cell ID to derive the scrambling ID for each component carrier.

As another example, the multi-CC transmission module 308 may use an index based on just the scheduled component carriers for transmission of the data. If, again, just the first and fourth component carriers are scheduled for use in transmitting the data, in this example the index value for the first component carrier may be 0 still, but the index value used for the fourth component carrier may be 1 because it is the next component carrier actually scheduled for use for this particular transmission. Thus, even though the fourth component carrier may have an absolute index value of 3 (in this example of four component carriers available for scheduling), the actual index value may be 1 where just the first and fourth component carriers are scheduled for use in transmission. While described with respect to the cell ID, the component carrier index values may alternatively be combined with some other value associated with some communication parameter between the BS 105 and the UE 300.

In yet other examples, the multi-CC transmission module 308 may not modify the scrambling ID but rather the RV used in modulation per component carrier used to transmit the data. The RV ID may be obtained from a sequence which may be configured via higher-layer signaling, such as RRC signaling. The multi-CC transmission module 308 may use this sequence to alternate between RV IDs per component carrier. Thus, the multi-CC transmission module 308 may use a first RV ID sequence when modulating a copy of the data for a first component carrier, a second RV ID sequence when modulating a copy of the data for a second component carrier, a third RV ID sequence when modulating a copy of the data for a third component carrier, and so forth for the number of component carriers scheduled for transmission. For example, the RV ID indicated in a grant to the UE 300 may be an initial offset for the first RV ID in an RV ID sequence, cycling through the sequence for each of the component carriers (i.e., in the frequency domain). The receiving device, such as the BS 105, is aware of the RV ID sequence as well, and is therefore capable of discerning the copies of the data transmitted via the respective component carriers. In some further examples, the multi-CC transmission module 308 may implement a combination of scrambling ID variation and RV ID variation in a manner known to the receiving device.

The multi-CC transmission module 308 may apply the various examples above to CP-OFDM signals (in this example in the UL). The multi-CC transmission module may apply the various examples above (e.g., rate matching for the data without repetition, scrambling ID variations for repetitions of the data, and/or RV variations for repetitions of the data across component carriers) to other types of modulation as well, such as DFT-s-OFDM. Alternatively or in addition, a new manner of generating the DFT-s-OFDM waveform for the data may be used to minimize the PAPR. For example, a DFT may be performed on the input data, the output of the DFT may be tone-mapped to each of the component carriers for which the data is to be transmitted/repeated, and independent inverse fast fourier transforms (IFFTs) can then be performed on each tone-mapped output (e.g., with the number of channels for the IFFTs corresponding to the number of component carriers being used for the transmission). The outputs of each IFFT may be, in their respective channels, up-sampled and up-converted, then the outputs of each of those processes summed together for transmission. Thus, there may be a separate IFFT used per component carrier.

In some examples, the size of the DFT may be large enough to generate the frequency domain signal across multiple carriers, such as a DFT size that covers all allocated resource elements in all component carriers. For example, the DFT size may be a multiple of $2^i*3^j*5^k$ where i, j, and k each represent non-negative integers (e.g., the total may be a multiple as opposed to the individual component carrier). The combined (e.g., summed) signal may be provided to the transceiver 310 for transmission (or, where the multi-CC transmission module 308 is part of the modem 312, to the RF unit 314 to complete transmission) via the antennas 316. Whether the UE 300 uses CP-OFDM or DFT-s-OFDM (or some other form of modulation) according to embodiments of the present disclosure may be signaled to the UE 300 at some time beforehand. Moreover, the type of modulation may change from one UL transmission to the next, or may remain the same for a period of time and then change, etc.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions, such as of repetitions of the data on multiple component carriers, or the data rate matched across the component carriers, etc.) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The modem subsystem 312 may encode data as CP-OFDM signals, or DFT-s-OFDM signals. DFT-s-OFDM signals may be generated as in data processing scheme 500 discussed herein with respect to FIG. 5 in cooperation with the multi-CC transmission module 308. Such a scheme includes performing a DFT on the repeated data, tone mapping to each CC, and performing individual IFFTs for each CC as discussed above and further below.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310, and provide the information to other components of the UE 300 for further processing/use. This may include to the multi-CC transmission module 308, for example in situations where a transmitting device such as a BS 105 is sending a message replicated across component carriers according to embodiments of the present disclosure on the DL. The antennas 316 may include multiple antennas of similar or different designs in order to sustain multiple transmission links. The RF unit 314 may configure the antennas 316.

In an embodiment, the UE 300 can include multiple transceivers 310 implementing different Radio Access Technologies (RATs) (e.g., NR and LTE). In an embodiment, the UE 300 can include a single transceiver 310 implementing multiple RATs (e.g., NR and LTE). In an embodiment, the transceiver 310 can include various components, where different combinations of components can implement RATs.

Figure 4:
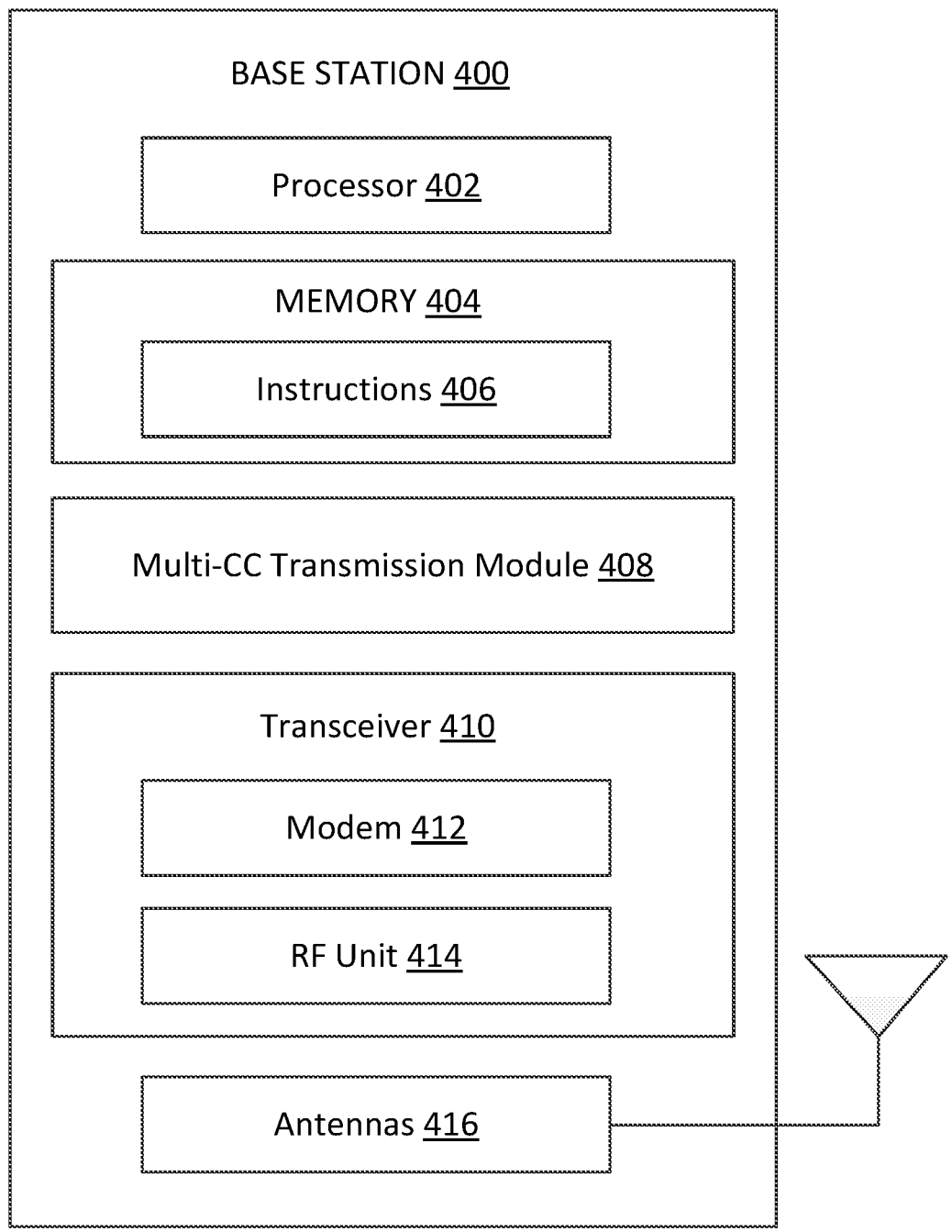
FIG. 4 illustrates a block diagram of an exemplary base station (BS) according to some embodiments of the present disclosure.

FIG. 4 is a block diagram of an exemplary BS 400 according to embodiments of the present disclosure. The BS 400 may be a BS 105 in the network 100 as discussed above in FIG. 1. As shown, the BS 400 may include a processor 402, a memory 404, a Multi-CC transmission module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 2-3 and 5-9. Instructions 406 may also be referred to as code, which may be interpreted broadly to include any type of computer-readable statement(s) as discussed above with respect to FIG. 4.

The Multi-CC transmission module 408 may be implemented via hardware, software, or combinations thereof. For example, the Multi-CC transmission module 408 may be implemented as a processor, circuit, and/or instructions 406 stored in the memory 404 and executed by the processor 402. In some examples, the Multi-CC transmission module 408 can be integrated within the modem subsystem 412. For example, the Multi-CC transmission module 408 can be implemented by a combination of software components (e.g., executed by a DSP or a general processor) and hardware components (e.g., logic gates and circuitry) within the modem subsystem 412.

The Multi-CC transmission module 408 may be used for various aspects of the present disclosure, for example, aspects of FIGS. 5-9. The Multi-CC transmission module 408 may be configured in a manner similar to that discussed above with respect to the multi-CC transmission module 308, albeit for DL transmissions to one or more UEs 300 instead of UL transmissions as was the case with respect to FIG. 3. Accordingly, the multi-CC transmission module 408 may aid in reducing PAPR according to one or more of the embodiments discussed above and further below.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or 400. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices. The modem subsystem 412 may encode data as some type of OFDM signals, such as CP-OFDM signals.

The RF unit 414 may provide the modulated and/or processed data, e.g. data packets (or, more generally, data messages that may contain one or more data packets and other information), to the antennas 416 for transmission to one or more other devices. This may include, for example, transmission of repetitions of data on multiple component carriers to a UE 300 according to embodiments of the present disclosure. The antennas 416 may further receive data messages transmitted from other devices and provide the received data messages for processing and/or demodulation at the transceiver 410. The antennas 416 may include multiple antennas of similar or different designs in order to sustain multiple transmission links.

In an embodiment, the BS 400 can include multiple transceivers 410 implementing different RATs (e.g., NR and LTE). In an embodiment, the BS 400 can include a single transceiver 410 implementing multiple RATs (e.g., NR and LTE). In an embodiment, the transceiver 410 can include various components, where different combinations of components can implement RATs.

Figure 5:
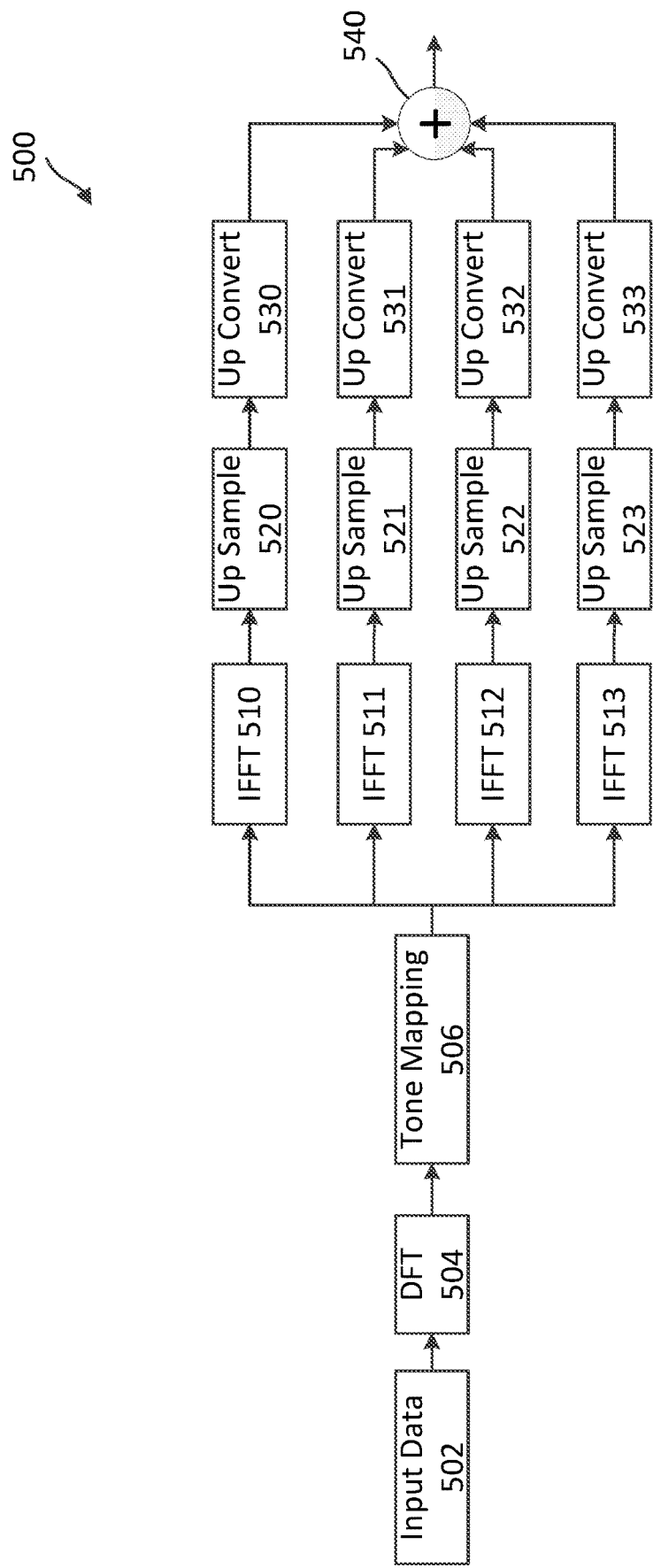
FIG. 5 illustrates a data processing scheme according to some embodiments of the present disclosure.

FIG. 5 illustrates a data processing scheme 500 according to some embodiments of the present disclosure. The data processing scheme 500 may be employed UEs such as the UEs 300 or 115 in a network, such as the network 100, for UL communications. Specifically, scheme 500 may be used to generate a DFT-s-OFDM waveform for transmission on the UL. For example, a wireless communication device, such as the UE 300, and may utilize one or more components, such as the processor 302, the memory 304, the Multi-CC transmission module 308, the transceiver 310, the modem 312, and the one or more antennas 316, to execute the data processing scheme 500.

Input data 502 comprises a concatenation of the repeated signal for each component carrier (where repeated; otherwise, rate matched across component carriers). The size, therefore, of the DFT 504 may cover all allocated REs in all component carriers. For example, the DFT 504 may have a size that is a multiple $2^i*3^j*5^k$ where i, j, and k each represent non-negative integers (of the total, not the individual component carriers). The DFT 504 may also, in some examples or implementations (depending upon the nature of the data), include zero padding to achieve a particular size that is a proper multiple. After the input data 502 has passed through the DFT 504, the outcome of the DFT 504 is tone mapped at tone mapping block 506. In particular, a different portion of the outcome of the DFT 504 is tone mapped to each of the component carrier frequencies (also referred to herein as different "channels" of the DFT-s-OFDM scheme 500). This may correspond, for example, to a different copy of the data being tone mapped to each channel at different component carrier frequencies. In other examples, this may correspond to the rate-matched data (after DFT 504) being evenly split between the multiple channels. The tone mapping shifts the respective portions of the DFT output from the DFT 504 to each of the component carrier frequencies.

After tone mapping 506, individual IFFTs are performed for each tone-mapped version on a per-component carrier basis at blocks 510-513. Thus, the respective portion of the data in each of the channels may be processed by a different IFFT, since IFFT 510 is different than IFFT 511, which is different than IFFT 512, which is also different than IFFT 513. In other words, there may be a different IFFT per component carrier. The IFFTs may further occur in parallel as part of the generation. After each IFFT 510-513 is performed, each IFFT output is up sampled respectively at blocks 520-523. The upsampled output of each up sample 520-523 is then up converted at respective blocks 530-533. This up-conversion places the portions of the data in the respective channels back to the frequencies of their corresponding component carriers, for example. The outputs of the up conversions are then all summed together 540 as an output signal. This output signal is a DFT-s-OFDM waveform that achieves lower PAPR than a traditional DFT-s-OFDM waveform would achieve if applied to each component carrier.

The scheme 500 may be used apart from the other embodiments of the present disclosure, or in addition thereto. Thus, in some examples data that is repeated to multiple DFT-s-OFDM waveforms may be generated according to the scheme 500 without further modifications discussed herein, while in other examples the data may be rate matched across the component carriers treated as a single virtual BWP or scrambled with different values (e.g., scrambling IDs and/or RV IDs) to further help minimize the PAPR impact from replicating the data across the component carriers.

Figure 6:
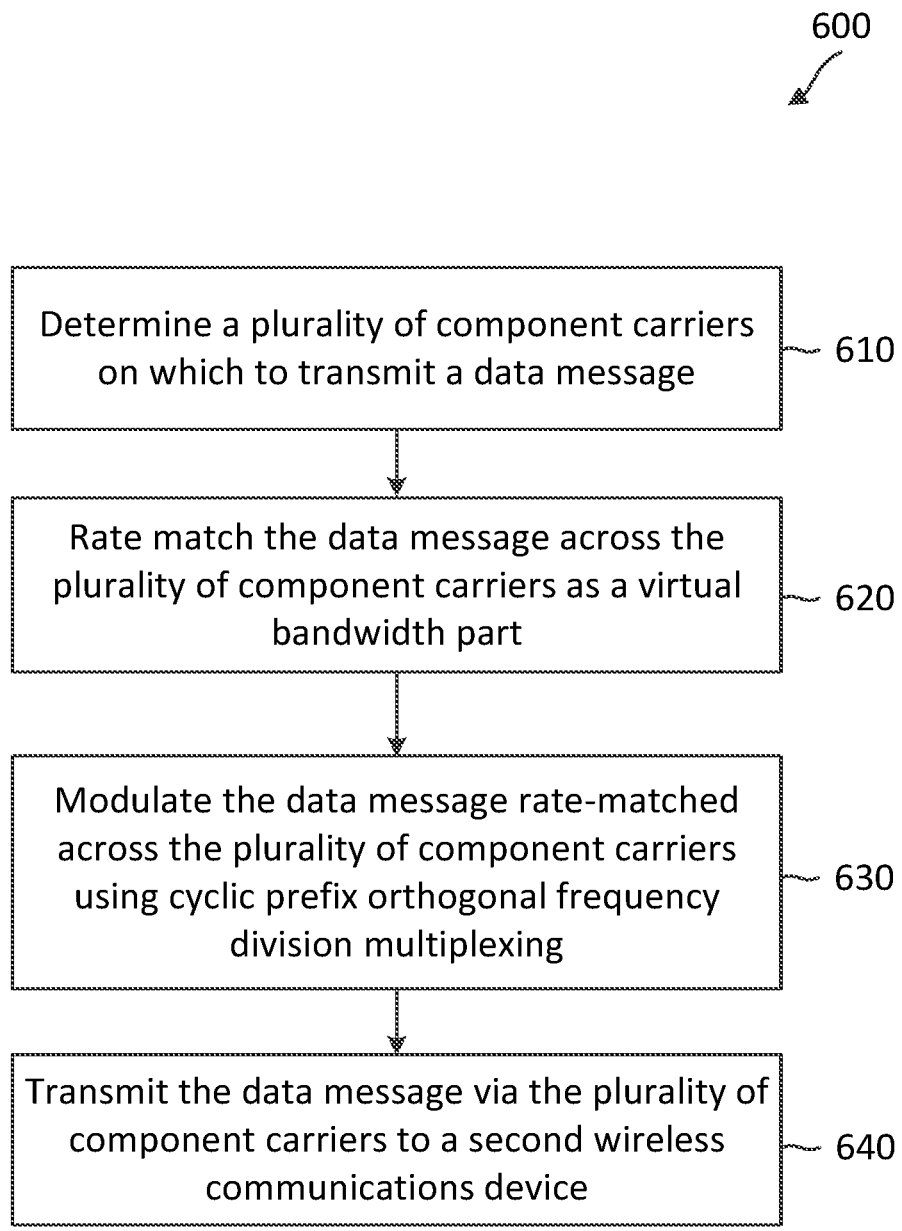
FIG. 6 illustrates a flow diagram of a wireless communication method according to some embodiments of the present disclosure

FIG. 6 is a flow diagram of a communication method 600 according to some embodiments of the present disclosure. Blocks of the method 600 can be executed by a computing device (e.g., a processor, processing circuit, and/or other suitable component) of a wireless communication device or other suitable means for performing the steps. For example, a wireless communication device, such as the UE 115 or UE 300, and may utilize one or more components, such as the processor 302, the memory 304, the Multi-CC transmission module 308, the transceiver 310, the modem 312, and the one or more antennas 316, to execute the steps of method 600. A wireless communications device such as BS 400 or BS 105 could also be utilized, and method 600 may utilize one or more components, such as the processor 402, the memory 404, the Multi-CC transmission module 408, the transceiver 410, the modem 412, and the one or more antennas 416, to execute the steps of method 600. As illustrated, the method 600 includes a number of enumerated steps, but embodiments of the method 600 may include additional steps before, after, and in between the enumerated steps. In some embodiments, one or more of the enumerated steps may be omitted or performed in a different order.

At block 610, a wireless communications device determines a plurality of component carriers on which to transmit a data message. Each component carrier may be defined by a span of a number of RBs in the frequency domain. A single component carrier, for example, may have a bandwidth ranging from about 1.4 to 80 MHz (or may be lower or higher than those values). As just one example, when each component carrier is 80 MHz, four component carriers may be combined to achieve a 320 MHz bandwidth (e.g., a bandwidth at which the allowed EIRP and/or PSD is reached). The number of component carriers in use may be determined in advance statically or semi-statically. Alternatively, the number of component carriers in use may be determined dynamically in response to changing channel properties. The component carriers may be contiguous to each other or non-contiguous to each other.

At block 620, the wireless communications device rate matches the data message across the plurality of component carriers as a virtual bandwidth part. In other words, instead of rate matching within each component carrier separately, the wireless communications device treats the multiple component carriers as one virtual bandwidth part. Accordingly, the wireless communications device does not repeat the data in each component carrier, but rather spreads out the data across the component carriers via the continuous rate matching. With this approach, the PAPR may remain within an acceptable level.

At block 630, the wireless communications device modulates the data message rate-matched across the plurality of component carriers using CP-OFDM.

At block 640, the wireless communications device transmits the data message via the plurality of component carriers to a second wireless communications device. For example, a UE 300 may transmit the data message after modulation to a BS 400. As another example, a BS 400 may transmit the data message after modulation to a UE 300.

Figure 7:
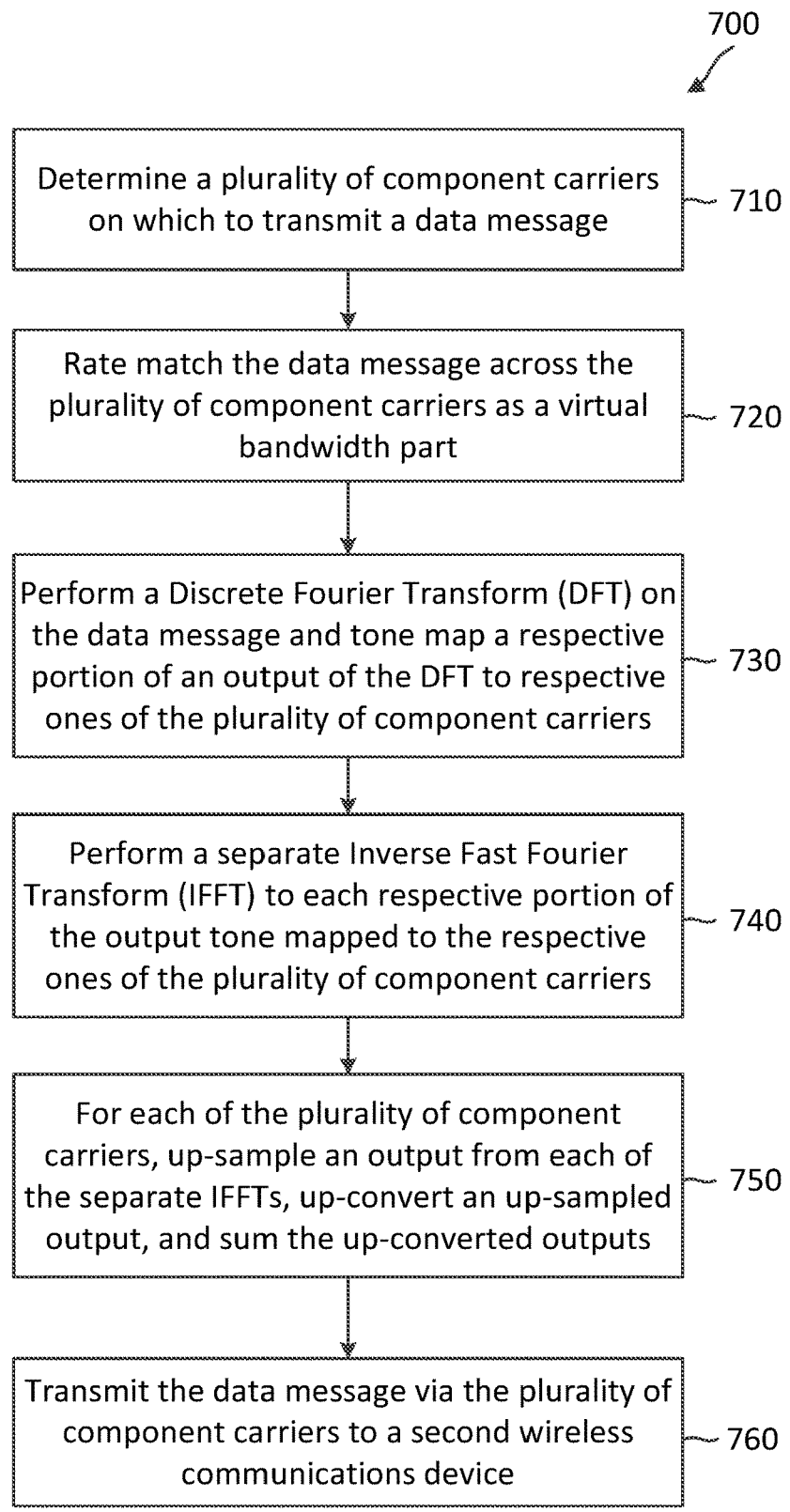
FIG. 7 illustrates a flow diagram of a wireless communication method according to some embodiments of the present disclosure

FIG. 7 is a flow diagram of a communication method 700 according to some embodiments of the present disclosure. Steps of the method 700 can be executed by a computing device (e.g., a processor, processing circuit, and/or other suitable component) of a wireless communication device or other suitable means for performing the steps. For example, a wireless communication device, such as the UE 115 or UE 300, and may utilize one or more components, such as the processor 302, the memory 304, the Multi-CC transmission module 308, the transceiver 310, the modem 312, and the one or more antennas 316, to execute the steps of method 700. As illustrated, the method 700 includes a number of enumerated steps, but embodiments of the method 700 may include additional steps before, after, and in between the enumerated steps. In some embodiments, one or more of the enumerated steps may be omitted or performed in a different order.

At block 710, a UE 300, such as by a multi-CC transmission module 308 of UE 300, determines a plurality of component carriers on which to transmit a data message. This block is similar to block 610 as discussed with respect to FIG. 6.

At block 720, the UE 300 rate matches the data message across the plurality of component carriers as a virtual bandwidth part, similar to as discussed above with respect to block 620 of FIG. 6.

While FIG. 6 described modulating using CP-OFDM, FIG. 7 describes modulating using a modified form of DFT-s-OFDM that aids in minimizing PAPR according to embodiments of the present disclosure. At block 730, the UE 300 performs a Discrete Fourier Transform (DFT) on the data message. The input to the DFT may be the signal rate matched across the component carriers in use as per block 720. This may be performed in accordance with DFT 504 as described with reference to FIG. 5. Further, the UE 300 tone maps a respective portion of an output of the DFT to respective ones of the plurality of component carriers. For example, the rate-matched data (after DFT) may be evenly split between the multiple channels corresponding to each of the plurality of component carriers.

At block 740, the UE 300 performs a separate Inverse Fast Fourier Transform (IFFT) to each respective portion of the output tone mapped to the respective ones of the plurality of component carriers. This may be performed in accordance with IFFTs 510-513 as described with reference to FIG. 5. Thus, the respective portion of the data in each of the channels may be processed by a different IFFT per component carrier. The IFFTs may further occur in parallel as part of the generation of method 600.

At block 750, the UE 300, for each of the plurality of component carriers in their respective channels, up-samples an output from each of the separate IFFTs, and up-converts the up-sampled output. The UE 300 may also sums the up-converted outputs from each of the channels together.

At block 760, the UE 300 transmits the data message as combined from block 750 via the plurality of component carriers to a second wireless communications device, such as a BS 400.

The examples described above with respect to FIGS. 7 and 8 use rate matching to spread the data across the component carriers. In other embodiments, a wireless communications device may instead repeat the data to multiple component carriers. Some examples of this are demonstrated with respect to FIGS. 8 and 9 below.

Figure 8:
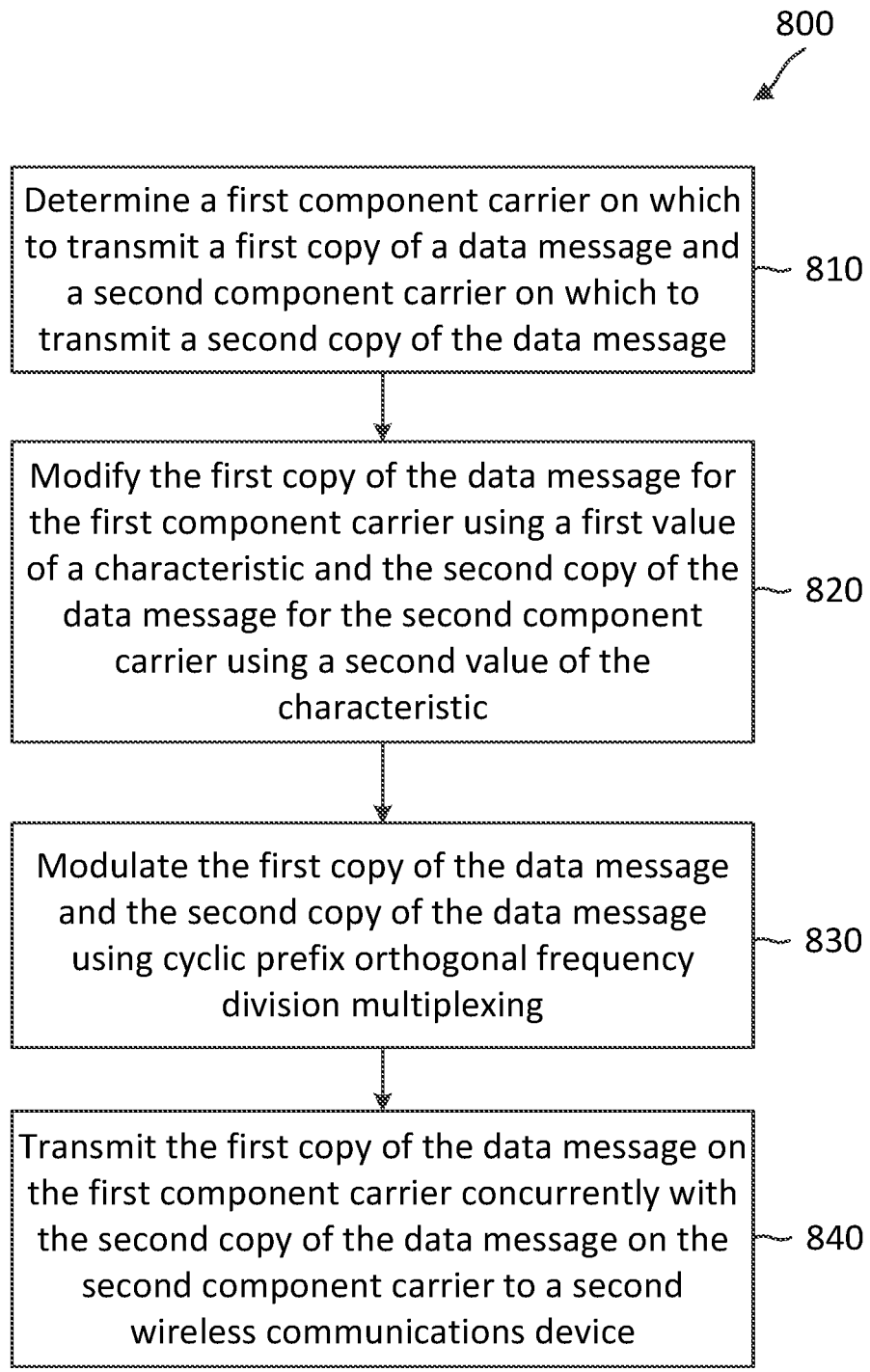
FIG. 8 illustrates a flow diagram of a wireless communication method according to some embodiments of the present disclosure

FIG. 8 is a flow diagram of a communication method 800 according to some embodiments of the present disclosure. Steps of the method 800 can be executed by a computing device (e.g., a processor, processing circuit, and/or other suitable component) of a wireless communication device or other suitable means for performing the steps. For example, a wireless communication device, such as the UE 115 or UE 300, and may utilize one or more components, such as the processor 302, the memory 304, the Multi-CC transmission module 308, the transceiver 310, the modem 312, and the one or more antennas 316, to execute the steps of method 800. A wireless communications device such as BS 400 or BS 105 could also be utilized, and method 800 may utilize one or more components, such as the processor 402, the memory 404, the Multi-CC transmission module 408, the transceiver 410, the modem 412, and the one or more antennas 416, to execute the steps of method 800. As illustrated, the method 800 includes a number of enumerated steps, but embodiments of the method 800 may include additional steps before, after, and in between the enumerated steps. In some embodiments, one or more of the enumerated steps may be omitted or performed in a different order.

At block 810, a wireless communications device determines a first component carrier on which to transmit a first copy of a data message and a second component carrier on which to transmit a second copy of the data message. This block is similar to block 610 as discussed with respect to FIG. 6 as relates to selecting component carriers, but differs in that it is using the component carriers to repeat the data message, instead of spread across them.

At block 820, the wireless communications device modifies the first copy of the data message for the first component carrier using a first value of a characteristic and the second copy of the data message for the second component carrier using a second value of the characteristic. The modification using the values may be performed in a number of ways in order to assist in minimizing PAPR from the repeated data on the component carriers. For example, the wireless communications device may use different scrambling IDs per component carrier to achieve the varied waveforms. The different scrambling IDs may be configured via an RRC signaling. Alternatively, the different scrambling IDs may be constructed (per component carrier, for example) using a combination of the cell ID and an index value per component carrier. In this approach, each component carrier may be numbered with an index value. In one example, this may use an absolute index, referring to numbering all of the component carriers, even if not all of the component carriers are scheduled for use in transmitting the data. As another example, the wireless communications device may use an index based on just the scheduled component carriers for transmission of the data.

In yet other examples, the wireless communications device may not modify the scrambling ID but rather the RV used in modulation per component carrier used to transmit the data. The RV ID may be obtained from a sequence which may be configured via higher-layer signaling, such as RRC signaling. The wireless communications device may use this sequence to alternate between RV IDs per component carrier. In some further examples, the multi-CC transmission module 308 may implement a combination of scrambling ID variation and RV ID variation in a manner known to the receiving device.

At block 830, the wireless communications device modulates the first copy of the data message and the second copy of the data message using CP-OFDM.

At block 840, the wireless communications device transmits the first copy of the data message on the first component carrier concurrently with the second copy of the data message on the second component carrier to a second wireless communications device. For example, a UE 300 may transmit the data message after modulation to a BS 400. As another example, a BS 400 may transmit the data message after modulation to a UE 300.

Figure 9:
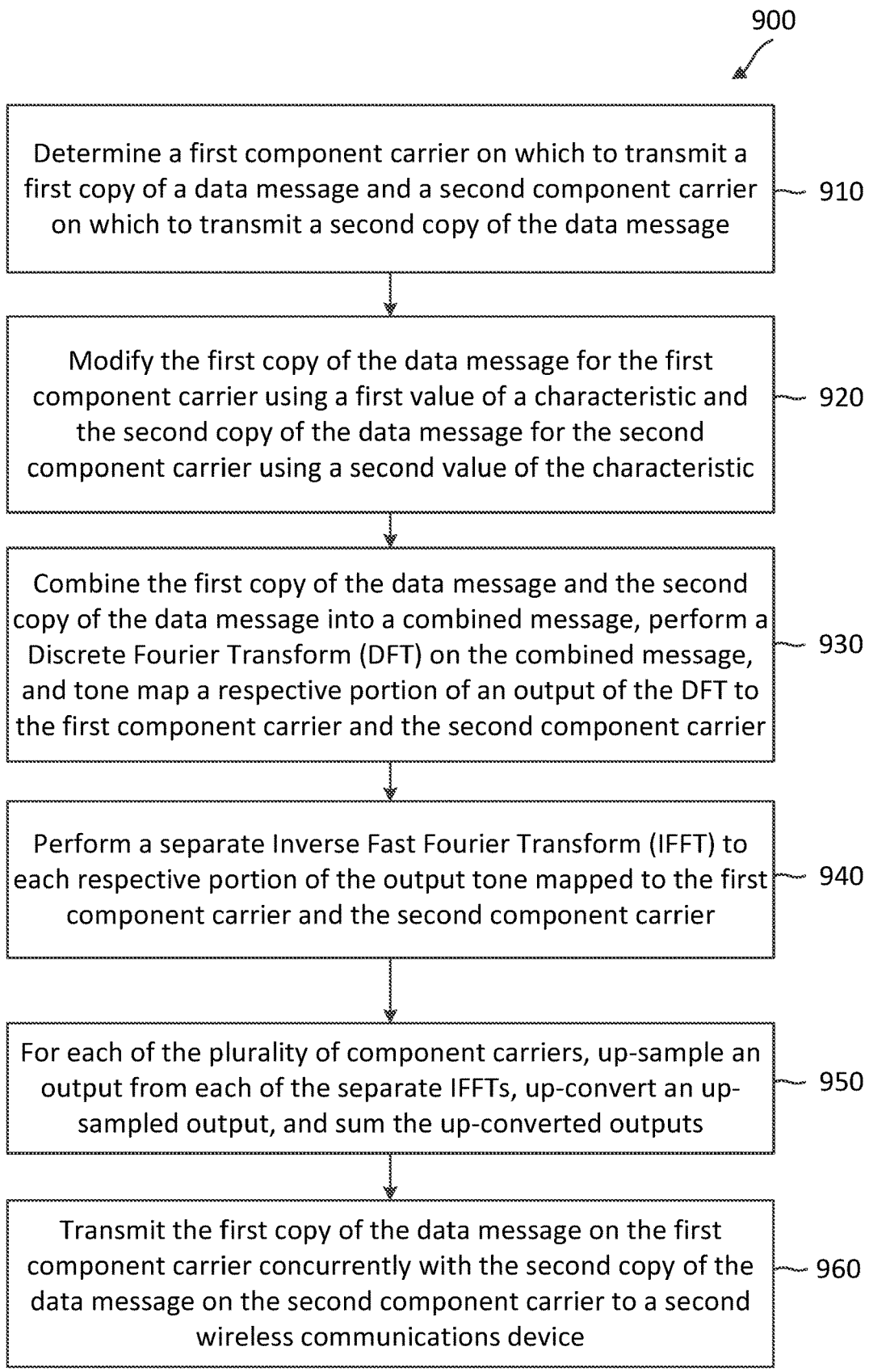
FIG. 9 illustrates a flow diagram of a wireless communication method according to some embodiments of the present disclosure

FIG. 9 is a flow diagram of a communication method 900 according to some embodiments of the present disclosure. Steps of the method 900 can be executed by a computing device (e.g., a processor, processing circuit, and/or other suitable component) of a wireless communication device or other suitable means for performing the steps. For example, a wireless communication device, such as the UE 115 or UE 300, and may utilize one or more components, such as the processor 302, the memory 304, the Multi-CC transmission module 308, the transceiver 310, the modem 312, and the one or more antennas 316, to execute the steps of method 900. As illustrated, the method 900 includes a number of enumerated steps, but embodiments of the method 900 may include additional steps before, after, and in between the enumerated steps. In some embodiments, one or more of the enumerated steps may be omitted or performed in a different order.

At block 910, a UE 300, such as by a multi-CC transmission module 308 of UE 300, determines a first component carrier on which to transmit a first copy of a data message and a second component carrier on which to transmit a second copy of the data message.

At block 920, the wireless communications device modifies the first copy of the data message for the first component carrier using a first value of a characteristic and the second copy of the data message for the second component carrier using a second value of the characteristic. This may be done on a component carrier by component carrier basis. Similar to the discussion with respect to block 820, the UE 300 may use different scrambling IDs per component carrier (e.g., the characteristic is a scrambling ID), such as varied by function of an index value of each component carrier. Alternatively, the UE 300 may use different RV IDs per component carrier, such as based on a sequence of values. Or, a combination of these may be applied to further provide differences between the copies of the data per component carrier.

At block 930, the UE 300 combines the first copy of the data message and the second copy of the data message into a combined message. For example, the 300 may concatenate the second copy of the data message to the first copy of the data message after each copy of the message has been modified according to block 920. Once combined, the UE 300 may perform a Discrete Fourier Transform (DFT) on the combined message. Further, and the UE 300 tone maps a respective portion of an output of the DFT to the first component carrier and the second component carrier. For example, the UE 300 may split up the output of the DFT on a copy-by-copy basis of the repeated data, the number of portions corresponding to the number of component carriers in use for the repeated data.

At block 940, the UE 300 performs a separate Inverse Fast Fourier Transform (IFFT) to each respective portion of the output tone mapped to the first component carrier and the second component carrier. Thus, the respective portion of the data in each of the channels may be processed by a different IFFT per component carrier (e.g., in parallel to each other).

At block 950, the UE 300, for each of the plurality of component carriers in their respective channels, up-samples an output from each of the separate IFFTs, and up-converts an up-sampled output in each channel. The UE 300 may also sum the up-converted outputs from each of the channels together.

At block 960, the UE 300 transmits the first copy of the data message on the first component carrier concurrently with the second copy of the data message on the second component carrier to a second wireless communications device (such as a BS 400), e.g., as combined from block 950.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication comprising:
   determining, by a first wireless communications device, a first component carrier on which to transmit a first copy of a data message and a second component carrier on which to transmit a second copy of the data message, the first and second component carriers being different from each other;
   coding, by the first wireless communications device, the first copy of the data message for the first component carrier using a first value of a coding characteristic and the second copy of the data message for the second component carrier using a second value of the coding characteristic, the first and second values being different from each other; and
   transmitting, by the first wireless communications device after the coding, the first copy of the data message on the first component carrier concurrently with the second copy of the data message on the second component carrier to a second wireless communications device.

2. The method of claim 1, wherein the coding characteristic comprises a scrambling identifier (ID), the first value comprises a first scrambling ID, and the second value comprises a second scrambling ID.

3. The method of claim 2, further comprising:
   determining, by the first wireless communications device, the first scrambling ID and the second scrambling ID based on a combination of a cell identifier and a component carrier index, the component carrier index being different for each of the first and second component carriers,
   wherein the component carrier index comprises an absolute index of component carriers, including scheduled and/or unscheduled component carriers.

4. The method of claim 1, wherein the coding characteristic comprises a redundancy version, the first value comprises a first redundancy version, and the second value comprises a second redundancy version.

5. The method of claim 4, further comprising:
   applying, sequentially by the first wireless communications device, the second redundancy version to the second component carrier after applying the first redundancy version to the first component carrier.

6. The method of claim 4, wherein the redundancy version comprises a cyclic sequence including the first redundancy version and the second redundancy version.

7. The method of claim 1, further comprising:
   modulating, by the first wireless communications device after the coding and before the transmitting, the first copy of the data message and the second copy of the data message using cyclic prefix orthogonal frequency division multiplexing.

8. The method of claim 1, further comprising:
   modulating, by the first wireless communications device after the coding and before the transmitting, the first copy of the data message and the second copy of the data message using discrete fourier transform spread orthogonal frequency division multiplexing.

9. The method of claim 8, wherein the modulating further comprises:
   combining, by the first wireless communications device after the coding, the first copy of the data message and the second copy of the data message into a combined message;
   performing, by the first wireless communications device, a Discrete Fourier Transform (DFT) on the combined message; and
   tone mapping, by the first wireless communications device, a respective portion of an output of the DFT to the first component carrier and the second component carrier.

10. The method of claim 9, wherein the modulating further comprises:
    performing, by the first wireless communications device, a separate Inverse Fast Fourier Transform (IFFT) to each respective portion of the output tone mapped to the first component carrier and the second component carrier, wherein the separate IFFTs are different for each of the first and second component carriers.

11. The method of claim 10, wherein the modulating further comprises:
    up-sampling, by the first wireless communications device, an output from each of the separate IFFTs for each of the first and second component carriers; and
    up-converting, by the first wireless communications device, an up-sampled output for each of the first and second component carriers,
    wherein the transmitting the first copy of the data message and the second copy of the data message comprises transmitting a summation of the up-converted output for each of the first and second component carriers.

12. A first wireless communications device, comprising:
    a processor configured to determine a first component carrier on which to transmit a first copy of a data message and a second component carrier on which to transmit a second copy of the data message, the first and second component carriers being different from each other;

the processor further configured to code the first copy of the data message for the first component carrier using a first value of a coding characteristic and the second copy of the data message for the second component carrier using a second value of the coding characteristic, the first and second values being different from each other; and a transceiver configured to transmit, after the coding, the first copy of the data message on the first component carrier concurrently with the second copy of the data message on the second component carrier to a second wireless communications device.

13. The first wireless communications device of claim 12, wherein the coding characteristic comprises a scrambling identifier (ID), the first value comprises a first scrambling ID, and the second value comprises a second scrambling ID.

14. The first wireless communications device of claim 13, further comprising:

the processor further configured to determine the first scrambling ID and the second scrambling ID based on a combination of a cell identifier and a component carrier index, the component carrier index being different for each of the first and second component carriers, wherein the component carrier index comprises an absolute index of component carriers, including scheduled and/or unscheduled component carriers.

15. The first wireless communications device of claim 12, wherein the coding characteristic comprises a redundancy version, the first value comprises a first redundancy version, and the second value comprises a second redundancy version.

16. The first wireless communications device of claim 15, further comprising:

the processor further configured to apply sequentially the second redundancy version to the second component carrier after applying the first redundancy version to the first component carrier.

17. The first wireless communications device of claim 15, wherein the redundancy version comprises a cyclic sequence including the first redundancy version and the second redundancy version.

18. The first wireless communications device of claim 12, further comprising:

the processor further configured to modulate, after the coding and before the transmitting, the first copy of the data message and the second copy of the data message using cyclic prefix orthogonal frequency division multiplexing.

19. The first wireless communications device of claim 12, further comprising:

the processor further configured to modulate, after the coding and before the transmitting, the first copy of the data message and the second copy of the data message using discrete fourier transform spread orthogonal frequency division multiplexing.

20. The first wireless communications device of claim 19, wherein the modulating further comprises:

combining, after the coding, the first copy of the data message and the second copy of the data message into a combined message;

performing a Discrete Fourier Transform (DFT) on the combined message; and tone mapping a respective portion of an output of the DFT to the first component carrier and the second component carrier.

21. The first wireless communications device of claim 20, wherein the modulating further comprises:

performing a separate Inverse Fast Fourier Transform (IFFT) to each respective portion of the output tone mapped to the first component carrier and the second component carrier, wherein the separate IFFTs are different for each of the first and second component carriers.

22. The first wireless communications device of claim 21, wherein the modulating further comprises:

up-sampling an output from each of the separate IFFTs for each of the first and second component carriers; and up-converting an up-sampled output for each of the first and second component carriers, wherein the transmitting the first copy of the data message and the second copy of the data message comprises transmitting a summation of the up-converted output for each of the first and second component carriers.

23. A non-transitory computer-readable medium having program code recorded thereon, the program code comprising:

code for causing a first wireless communications device to determine a first component carrier on which to transmit a first copy of a data message and a second component carrier on which to transmit a second copy of the data message, the first and second component carriers being different from each other;

code for causing the first wireless communications device to code the first copy of the data message for the first component carrier using a first value of a coding characteristic and the second copy of the data message for the second component carrier using a second value of the coding characteristic, the first and second values being different from each other; and code for causing the first wireless communications device to transmit, after the coding, the first copy of the data message on the first component carrier concurrently with the second copy of the data message on the second component carrier to a second wireless communications device.

24. The non-transitory computer-readable medium of claim 23, wherein the coding characteristic comprises a scrambling identifier (ID), the first value comprises a first scrambling ID, and the second value comprises a second scrambling ID.

25. A first wireless communications device comprising:

means for determining a first component carrier on which to transmit a first copy of a data message and a second component carrier on which to transmit a second copy of the data message, the first and second component carriers being different from each other;

means for coding the first copy of the data message for the first component carrier using a first value of a coding characteristic and the second copy of the data message for the second component carrier using a second value of the coding characteristic, the first and second values being different from each other; and means for transmitting, after the coding, the first copy of the data message on the first component carrier concurrently with the second copy of the data message on the second component carrier to a second wireless communications device.

26. The first wireless communications device of claim 25, wherein the coding characteristic comprises a scrambling identifier (ID), the first value comprises a first scrambling ID, and the second value comprises a second scrambling ID.

27. The first wireless communications device of claim 26, further comprising:
    means for determining the first scrambling ID and the second scrambling ID based on a combination of a cell identifier and a component carrier index, the component carrier index being different for each of the first and second component carriers,
    wherein the component carrier index comprises an absolute index of component carriers, including scheduled and/or unscheduled component carriers.

28. The first wireless communications device of claim 25, wherein the coding characteristic comprises a redundancy version, the first value comprises a first redundancy version, and the second value comprises a second redundancy version.

29. The first wireless communications device of claim 28, further comprising: means for applying, sequentially, the second redundancy version to the second
    component carrier after applying the first redundancy version to the first component carrier.

30. The first wireless communications device of claim 28, wherein the redundancy version comprises a cyclic sequence including the first redundancy version and the second redundancy version.

31. The first wireless communications device of claim 25, further comprising:
    means for modulating, after the coding and before the transmitting, the first copy of the data message and the second copy of the data message using cyclic prefix orthogonal frequency division multiplexing.

32. The first wireless communications device of claim 25, further comprising:
    means for modulating, after the coding and before the transmitting, the first copy of the data message and the second copy of the data message using discrete fourier transform spread orthogonal frequency division multiplexing.

33. The first wireless communications device of claim 32, wherein the modulating further comprises:
    combining, after the coding, the first copy of the data message and the second copy of the data message into a combined message;
    performing a Discrete Fourier Transform (DFT) on the combined message; and
    tone mapping a respective portion of an output of the DFT to the first component carrier and the second component carrier.

34. The first wireless communications device of claim 33, wherein the modulating further comprises:
    performing a separate Inverse Fast Fourier Transform (IFFT) to each respective portion of the output tone mapped to the first component carrier and the second component carrier, wherein the separate IFFTs are different for each of the first and second component carriers.

35. The first wireless communications device of claim 34, wherein the modulating further comprises:
    up-sampling an output from each of the separate IFFTs for each of the first and second component carriers; and
    up-converting an up-sampled output for each of the first and second component carriers, wherein the transmitting the first copy of the data message and the second copy of the
    data message comprises transmitting a summation of the up-converted output for each of the first and second component carriers.

* * * * *